(12) United States Patent
Ward et al.

(10) Patent No.: US 12,326,047 B2
(45) Date of Patent: Jun. 10, 2025

(54) PIPE CONNECTION

(71) Applicant: Aquaterra Energy Limited, Norwich (GB)

(72) Inventors: Martin Ward, Norwich (GB); Andrew Potts, Norwich (GB)

(73) Assignee: Aquaterra Energy Limited, Norwich (GB)

( * ) Notice: Subject to any disclaimer, the term of this patent is extended or adjusted under 35 U.S.C. 154(b) by 0 days.

(21) Appl. No.: 17/987,912

(22) Filed: Nov. 16, 2022

(65) Prior Publication Data

US 2023/0151912 A1   May 18, 2023

(30) Foreign Application Priority Data

Nov. 16, 2021   (GB) ...................................... 2116500

(51) Int. Cl.
*E21B 17/043*   (2006.01)
*E21B 17/046*   (2006.01)
*F16L 15/08*   (2006.01)
*F16L 25/06*   (2006.01)

(52) U.S. Cl.
CPC .......... *E21B 17/043* (2013.01); *E21B 17/046* (2013.01); *F16L 15/08* (2013.01); *F16L 25/065* (2013.01)

(58) Field of Classification Search
CPC ........ E21B 17/043; F16L 15/08; F16L 25/065
See application file for complete search history.

(56) References Cited

U.S. PATENT DOCUMENTS

| | | | | |
|---|---|---|---|---|
| 5,462,315 A | * | 10/1995 | Klementich | ........ E21B 17/0423 |
| 6,041,487 A | * | 3/2000 | Banker | ..................... F16J 15/04 |
| 6,328,343 B1 | * | 12/2001 | Hosie | ..................... F16L 25/065 |
| 2016/0281441 A1 | * | 9/2016 | Juarez | ................... E21B 17/042 |
| 2018/0230757 A1 | * | 8/2018 | Nelson | .................. E21B 17/043 |
| 2018/0230758 A1 | * | 8/2018 | Nelson | .................. E21B 17/043 |

FOREIGN PATENT DOCUMENTS

| | | | | |
|---|---|---|---|---|
| EP | 0405951 A1 | * | 1/1991 | ............. E21B 17/08 |
| GB | 2594252 A | | 10/2021 | |

* cited by examiner

*Primary Examiner* — Zachary T Dragicevich
(74) *Attorney, Agent, or Firm* — Bradley Arant Boult Cummings

(57) ABSTRACT

A pipe joint formed between a pin section and a box section. The pin and box sections each have a tubular pipe section, engaging at respective first ends in end-to-end arrangement and have a seal element partially therebetween. The box section includes a box stress collar extending from the first end, the box stress collar being generally cylindrical, axially aligned with the tubular box pipe section and having an inner diameter of the same size as the outer diameter of the pin section, enabling the box stress collar to be placed about the pin section. The pin and the box sections are secured together by means of one or more securing means housed in the box collar and actuable by exertion of radial pressure to urge the pin and box into sealing arrangement.

14 Claims, 6 Drawing Sheets

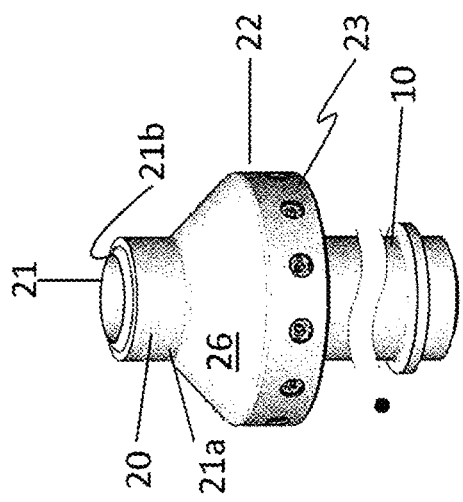
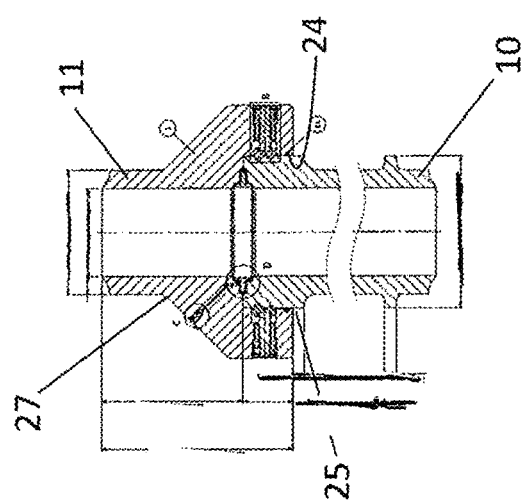
Figure 1a  Prior Art
Figure 1b

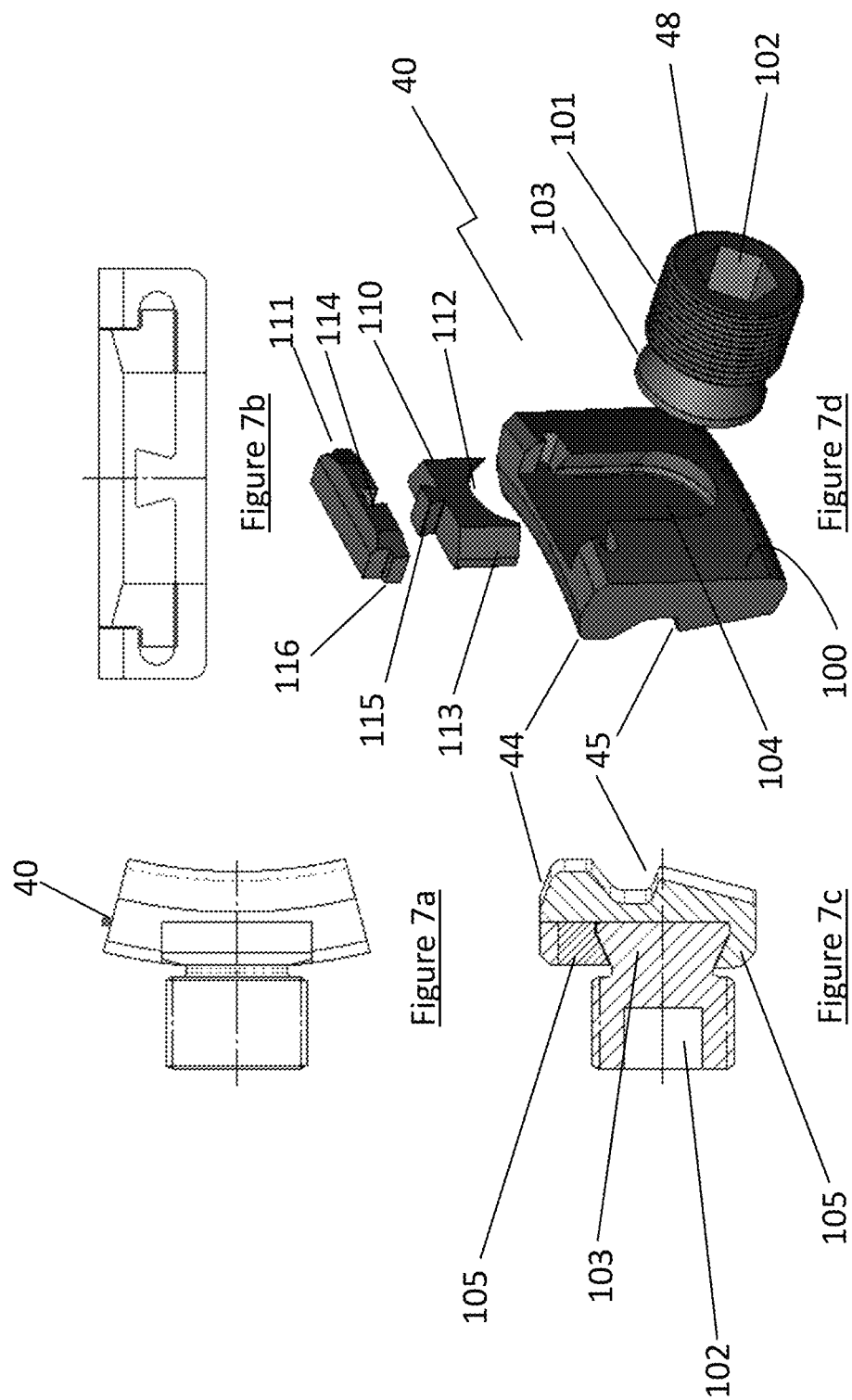

PIPE CONNECTION

FIELD OF THE INVENTION

The present invention relates to a connection between pipes for use in the oil and gas drilling industry. The invention is particularly intended for use in respect of connections having a smaller outer radius than is typical for such joints. The invention also provides a pin section and a box section for use in such a connection.

BACKGROUND TO THE INVENTION

Atypical joint between oil and gas pipes in a pipe string, such as a riser joint, comprises two pipe sections: referred to herein as a pin section and a box section by virtue of the pin end of one section engaging the box end of the other section. The two sections are urged together under tension to form a fluid-tight seal preventing egress of the fluid flowing within the pipe string. The particular joint contemplated herein is formed by lowering a box end of one section onto the upwardly facing pin end of a vertically deployed pipe section. Simply securing the two sections together to prevent their moving relative to each other and relying on the mass of the string above the joint to force the pin and the box sections together is insufficient to maintain a seal therebetween which is fluid-tight or which would remain fluid tight under the conditions of a typical well.

Although many different methods are known in the art are known to urge and secure the pipe sections together in a fluid-tight manner, the one particularly contemplated herein employs dogs which act by exerting a radially directed force which is partially converted into an axial force to push the pin and box sections together. Because of the mode of action of the dogs as described in more detail below, there is produced in the outer section of the box end, an outward radial reaction force which tries to force the outer section outwards away from the pin end. In prior art joints, the radial thickness of the box section is sufficiently high to be able to withstand the outwardly directed force, with the material from which the box section being formed storing the energy applied.

However, in some applications, a much thinner overall pipe is required. This entails the radial thickness of the box end being thinner than in conventional pipes, and the ability of the pipe to resist the outward force is correspondingly reduced. This results in the box end bending outwards, away from the pin end resulting in a weakening of the seal between the two sections and the possibility arising of the seal therebetween being compromised.

It is an object of the present invention to provide an improved joint between a pin and a box section which addresses the above problems. It is a further object of the invention to provide a method of securing a pin and a box section together which addresses the above problems.

SUMMARY OF THE INVENTION

According to a first aspect of the invention there is provided a pipe joint formed between a pin section and a box section;
the pin and box sections each having a tubular pipe section, engaging at respective first ends in end-to-end arrangement and having a seal element partially therebetween,
the box section including a box stress collar extending from the first end, the box collar being generally cylindrical, axially aligned with the tubular box pipe section and having an inner diameter of the same size as the outer diameter of the pin section, enabling the box stress collar to be placed about the pin section,
the pin and the box sections being secured together by means of a one or more securing means housed in the box collar and actuable to exert radial pressure to urge the pin and box into sealing arrangement,
the pin section including a circumferential collar located to engage a profiled end surface of the box stress collar on make-up of the joint, the circumferential collar including a circumferential pin channel defined by a pin edge rim, the profiled end surface of the box section including a box channel defined by an inner rim and an outer rim, the circumferential pin channel housing the inner rim of the box and the box channel housing the pin edge rim.

The engagement of the circumferential collar of the pin with the profiled end surface of the box collar allows a thinner collar to be utilised and hence a thinner overall pipe string.

Preferably, the or each channel rim has an inner-facing channel wall parallel to the pipe joint axis to allow radial stress forces to be resisted and redistributed.

Preferably, the box channel has a rectangular cross-section to facilitate engagement of a rim with a channel. Further preferably, both the box and the pin channels have a rectangular cross-section.

Preferably, one or both of the box channel and the pin channel have internal corners, said internal corners being curved to reduce corrosion.

Preferably, the ratio of the depth of the channel to the width of the channel is from 0.15-0.25 and further preferably from 0.19-0.23.

Preferably, the securing means comprises a dog, movable radially, the dog having one or more oblique surfaces within the box section, the engagement of the dog and box surfaces acting to generate an axial force directing the box section towards the pin section.

Preferably, the joint includes a push screw, further preferably threadably mounted to the box section, actuation of the push screw engaging the dog and causing radial motion of the dog. Yet further preferably, the push screw includes a slot and key arrangement to ease actuation and resist accidental removal of the push screw. Still yet further preferably, the push screw includes an aperture to ease actuation and facilitate tightening of the push screw. Yet more preferably, the push screw has a frustoconical head, the head being housed within a channel in the dog, a key engaging the dog, across the end of the channel to prevent release of the head from the channel.

Preferably, the end of the box section is chamfered to better enable make up of the joint and the location of the box section within the channel of the pin section.

According to a second aspect of the invention there is provided a pin section the pin section having a tubular pipe section and comprising a circumferential collar, located to engage an end surface of a box stress collar on make up of the joint, the circumferential collar including a circumferential pin channel defined by a pin edge rim.

According to a third aspect of the invention there is provided a box section, the box section including a box stress collar extending from the first end, the box collar being generally cylindrical, axially aligned with the tubular box pipe section and including a profiled end surface, the profiled end surface of the box section including a box channel defined by an inner rim and an outer rim.

BRIEF DESCRIPTION OF THE DRAWINGS

The invention is now described with reference to the accompanying drawings which show by way of example only one embodiment of a joint between a pin section and a box section. In the drawings:

FIGS. 1a and 1b show views of a prior art joint;
FIGS. 7a-7d illustrate, respectively, a top, part view, sectional view and perspective view of a push screw mechanism.

DETAILED DESCRIPTION OF THE INVENTION

Figure 3:
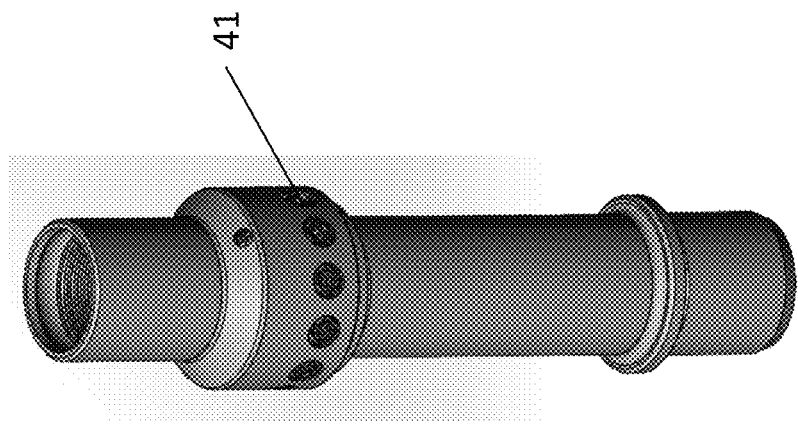
FIG. 3 is a perspective view of a made-up joint.

The provision of a fluid-tight seal in a pipe string intended to convey oil and gas, for example, from a well to a storage facility, is a difficult undertaking. The seal must be able to withstand high internal pressures and/or pressure differentials. Moreover, any such joint needs to be capable of being made-up and separated on multiple occasions in order to allow for a pipe section to be re-used. Within the art, many different types of joint are available, such as utilising a screw-thread, or a clamp. The present invention utilises a clamping-type mechanism to releasably join together two pipe sections one of which is designated as a pin section and the other, the box section.

Referring initially to FIG. 1a and 1b, these show a prior art joint formed between two vertically deployed pipe sections: a pin section 10 and a box section 20. This arrangement has been described in an earlier application of the current Applicant, GB2005679.2 from which some of the following text is taken.

The general arrangement can be seen in FIG. 1 in which a seal between two sections—a pin section and a box section—is shown. The pin, generally referenced 10, is secured in position at its in use lower end to a rig floor. The box section 20 is lowered onto the free end of the pin 10, with a metal-to-metal sealing gasket therebetween. Once the box 20 is in position, the two sections are sealed together to ensure they are fluid tight: typically to a pressure of around 17000 psi (1.17·10$^5$ kPa), but more generally to pressures of 3000 to 20000 psi (2.07·10$^4$-1.38·10$^5$ kPa). As a visual guide, a marking is provided on one or both of the pin 10 or the box 20 to enable correct alignment of the box 20 and the pin 10 relative to each other. As an example of a suitable marking, a coloured band can be applied to the outer surface of the pin 10, which enables both the axial position and also the mutual alignment of the pin's axis with the box's axis to be confirmed.

Generally, the box 20 has a tubular conduit 21 having an outer surface 21a and an inner surface 21b, in contact in use with the pressurised fluid. The inner diameter of the tubular conduit 21 usually matches that of the inner surface 11b of the pin 10, at least in their in-use immediate vicinities, to provide smooth flow along the pipe string formed. Extending from the end of the box 20 is a collar 22 having an outer radial face 23 generally parallel to that of the tubular conduit 21. The diameter of the inner surface 24 of the collar 22 is such that the inner surface 24 is contiguous on make up of the joint with the outer surface 25 of the pin 10, thus enabling a fluid tight seal to be easily made between these two surfaces 24, 25. The collar 22 is connected to the tubular conduit 21 of the box 20 by a connecting section 26. The connecting section 26 is generally frusto-conical. The outer face 27 of the connecting section 26 as shown is typically at an angle of around 45° with the tubular conduit 21, although the angle is chosen to suit the task for which the box is designed. In an alternative embodiment, not illustrated, the collar is joined directly to the tubular conduit 21, with no intermediate connecting section.

Figure 2:
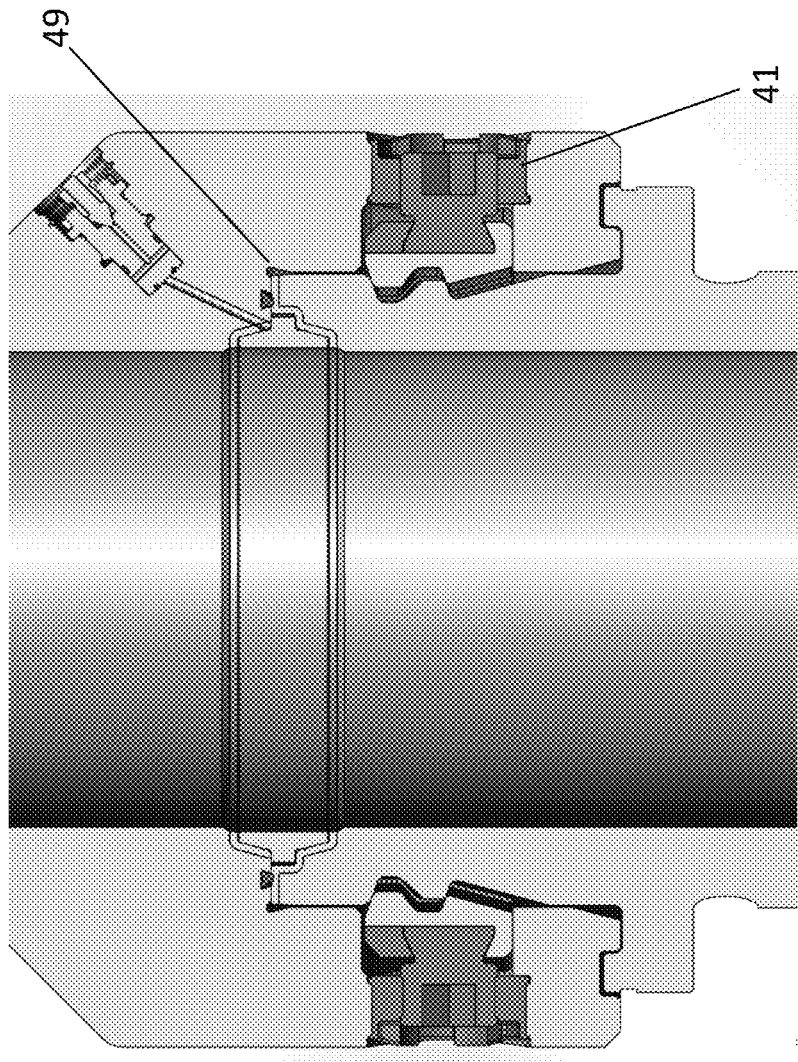
FIG. 2 illustrates the internal elements of a joint.
Figure 4:
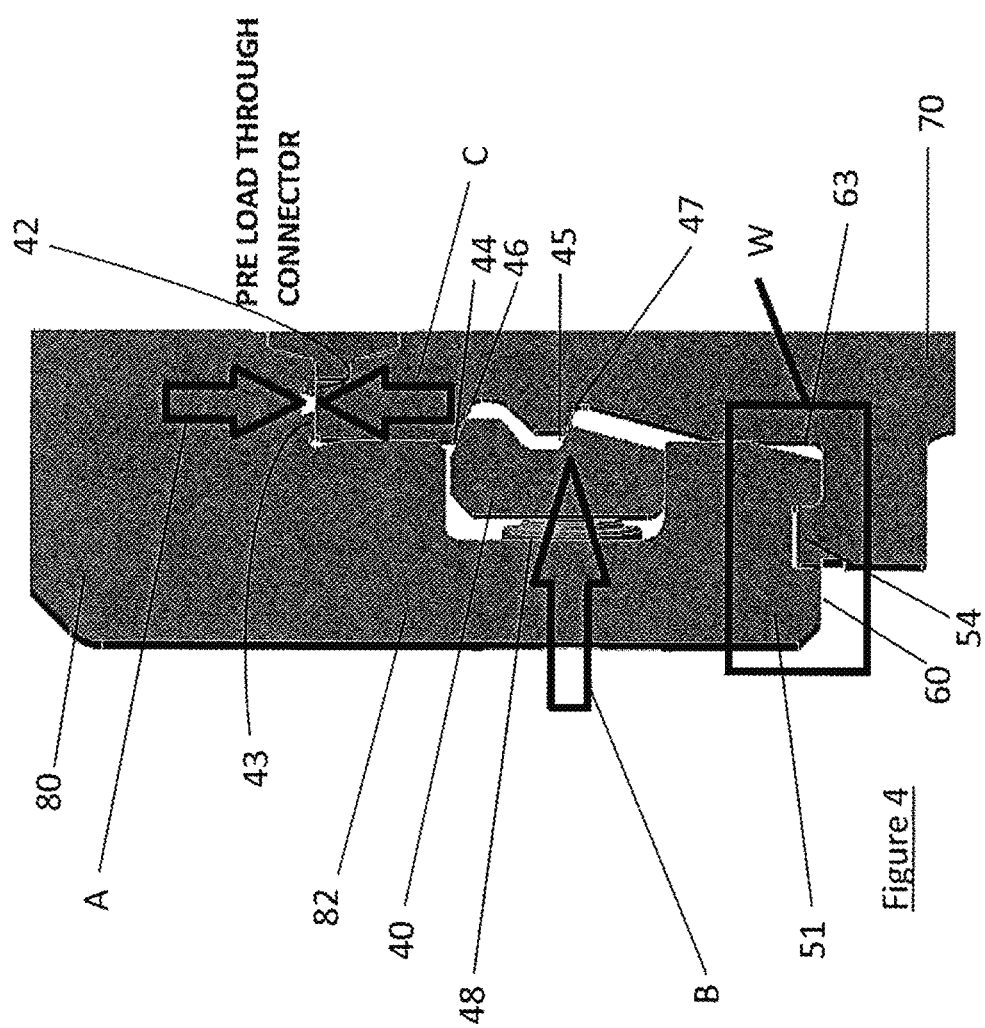
FIG. 4 is a sectional view of a portion of the joint.

The collar 22 in the prior art box section is of a relatively high radius. This enables the collar 22 to withstand the radial forces which arise on make-up of the joint, as the energy generated can be withstood by the material from which the collar 22 is formed without the material beginning to flow. FIG. 2 illustrates the internal elements of a joint. FIG. 4 is a sectional view of a portion of the joint. The origins of the radial force can be appreciated on inspection of FIG. 4 relating to the current invention. This illustrates the mode of sealingly securing the pin and box sections 70, 80 together.

The box section 80 is lowered onto the pin section 70 until the surface 42 of the box section 80 rests on the surface 43 of the pin section 70. A pre-load is then applied through a connector which causes a force in the direction of arrow A to drive the surfaces 42, 43 together. A plurality of dogs 40 housed within apertures 41 in the collar 82 of the box section 80, are then caused to move generally radially inwards in the direction of arrow B, towards the main axis of the pin section 70. This causes the obliquely orientated surfaces 44, 45 of a dog 40 to engage the corresponding obliquely orientated surfaces 46, 47 on the pin 70 and as a dog 40 continues to move inwardly, an axially directed force is generated in the direction of arrow C which causes a further increase in the force driving the surfaces 42, 43 together. Movement of a dog 40 is actuated by a push screw 48, in screw-threaded engagement with the wall of the box section 80. The push screw 48 is so housed within the box wall that it does not protrude beyond the outer diameter of the stress collar 51, even when the dog 40 is retracted and so does not increase the effective diameter of the box section 80. Release of a dog 40 is aided by the inclusion of an insert and key arrangement. Normally the push screw sits in a slot in the dog 40. This however only provides a bearing area of around 50%. The use of an insert increases the bearing area to around 100%. The key is then slotted in to prevent the insert from pushing upwards as a result of the force exerted on the taper of the push screw/insert interface.

The above process causes stress forces to build up in the region of contact between the surfaces 42, 43 as might be expected. However, the stress forces are transferred, at least partially as a reaction to the movement of the dogs 40, to the stress collar 51 as radially outward forces: shown as region W in FIG. 4. Where a thinner overall pipe string is required, the lower mass of material in the stress collar 51 can result in the stress collar 51 being insufficiently strong to withstand the force and eventually bending outwards. Indeed, it was believed in the industry to represent a limiting factor on how small the outer radius of a pipe joint of this kind in a pipe string could be made. To relieve the stresses which build up in other parts of the pipe, a groove 49, in the form of an undercut is included.

The present invention addresses the problem through the provision of a shoulder on the pin section 70, which shoulder includes a channel to engage a complementary structure on the end of the stress collar 51 of the box section 80.

The shoulder 50 on the pin section 70 is in the form of an annular disc about the outer surface of the pin 70. The shoulder 50 is preferably formed integral with the pin section 70 on manufacture. Running around the shoulder 50 of the pin section 70 is a channel 52, of generally rectangular cross-section. The internal corners 53 of the channel 52 are preferably curved to reduce any corrosion which might occur.

The end surface 60 of the region W of the box section 80 also includes a channel 61. The width of the channel 61 is sufficiently wide to allow the rim 54 of the channel 52 to be seated therein. Further, the inner rim 62 of the channel 61 is of width to allow the rim to be correspondingly seated within the channel 52.

In use therefore, as the joint is made up, with the box section 80 being lowered onto the pin section 70, the end surface 60 is lowered towards the shoulder 50, preferably into touching engagement, with the shoulder bearing a portion of the weight of the box section 80. The pin and box sections 70, 80 are aligned so that the rim of one section is housed within the channel of the other section. As the joint is energised, a force is generated which acts to force the region W radially outward. In the current invention this force is resisted by engagement between the rims 54, 62 and the respective channels 61, 52 in which the rims 54, 62 are housed. As a result, the region W is prevented from moving radially outwards and the integrity of the seal formed between the pin section 70 and the box section 80 maintained.

Figure 5:
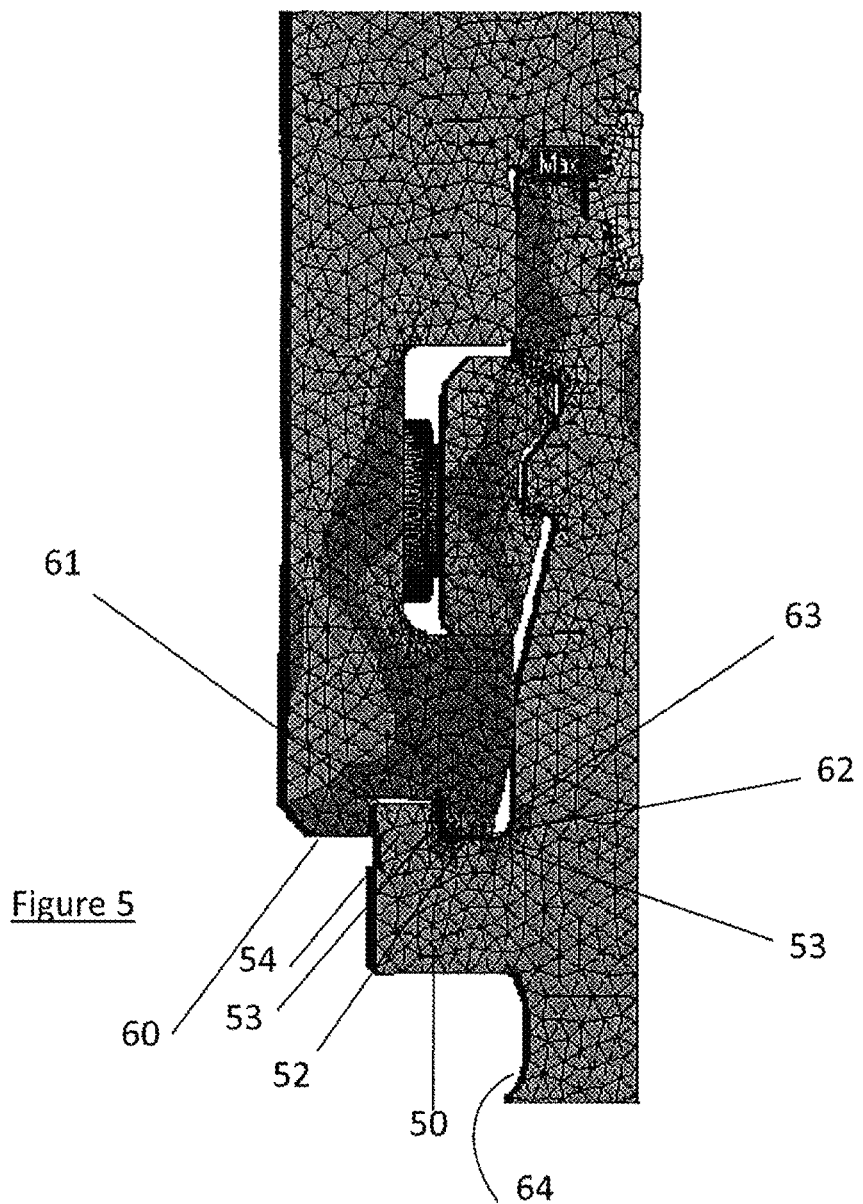
FIG. 5 is a further sectional view of the portion of the joint shown in FIG. 4 and illustrating the stress forces within the joint.
Figure 6:
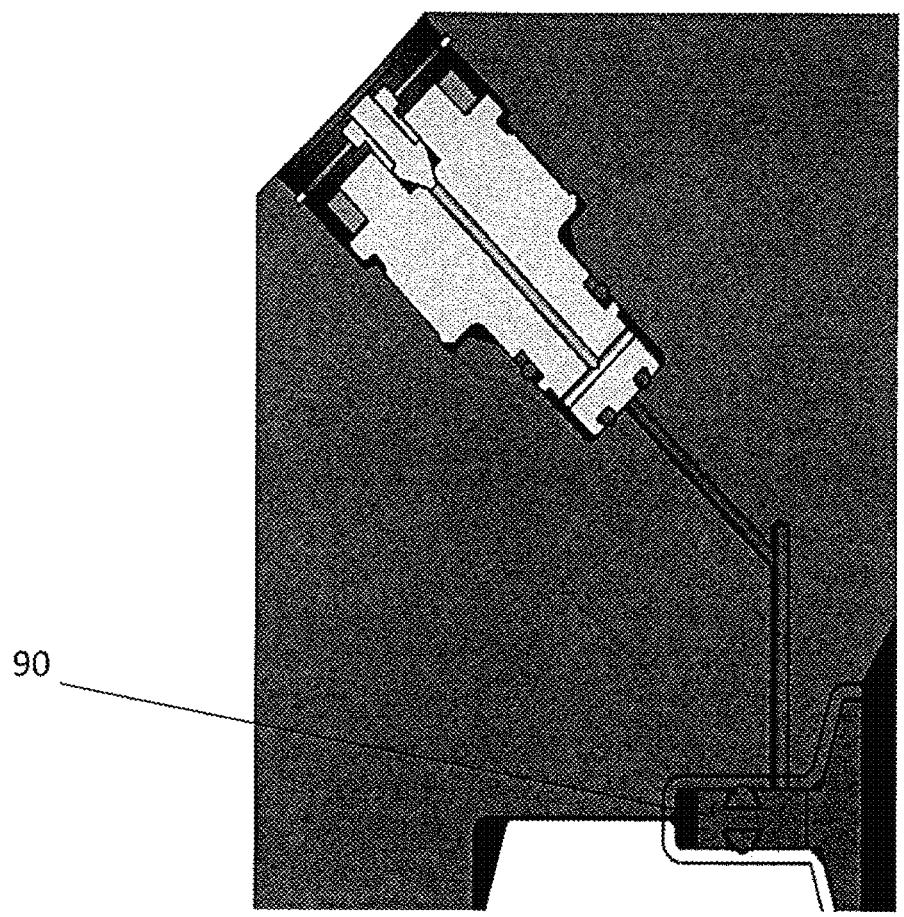
FIG. 6 illustrates a pressure-testing port.

In the embodiment illustrated in FIGS. 4 and 5, the end region W includes an optional chamfered section 63 which aids in the make-up of the joint by allowing the box section 80 to slide more easily over the pin section 70 in the event the inner diameter of the box section 80 has been made too narrow. FIG. 6 illustrates a pressure-testing port.

It has been found advantageous to include a groove 64 in the pin section 70, adjacent the shoulder 50, which groove 64 acts indicate that the joint is correctly made up. Alternatively or additionally a coloured band can be included on one or both of the pin 70 and box 80 sections to provide an indication that the joint is correctly made up.

Typically two secondary GRAYLOC® seals 90 are installed between the pin and box sections and including a testing means to determine the pressure being held. This has been reduced to one, housed in the box as shown in FIG. 5 thus reducing the seal to one.

In a further embodiment, the depth of the channel 61 in the box shoulder is 0.32 mm and the width of the channel 61 is 1.37 mm. The depth the channel 52 in the box shoulder is 0.29 mm and the width of the channel 52 is 1.477 mm.

The push screw mechanism is illustrated in more detail in FIGS. 7a-7d. The mechanism comprises a dog 40 having the profiled surfaces 44 and 45 as shown in FIG. 4. On the obverse side 100 of the dog 40 is a seating arrangement for the push screw 48. The push screw 48 has a threaded portion 101 to threadably engage a corresponding threaded portion within the box 80. A hexagonal aperture 102 enables a tightening means to be utilised to exert torque on the push screw 48 to tighten the push screw into position. The push screw 48 includes a securing head 103 of frusto-conical cross-section. In use, the securing head 103 is slidably secured within a channel 104 in the obverse side 100. The walls 105 of the channel 104 prevent the push screw 48 from exiting the channel 104 in a direction along the axis of the push screw 48 in that they are angled to correspond with the frusto-conical surface of the securing head 103. An insert and key mechanism prevent the push screw 48 from sliding out of the channel 104. The insert 110 slides into the channel 104, with the curved surface 112 of the insert 110 contiguously engaging the frusto-conical surface of the securing head 103. The walls 113 of the insert 110 engage the walls 105 of the channel 104. The key 111 sits atop the key 110 and prevents the hey from sliding out of the channel 104. A trapezoidal prismatic cut out 114 in the key engages the corresponding trapezoidal prismatic lock 115 on the insert 110. The feet 116 on the key 111 are housed within apertures 116 in the dog 40.

The invention claimed is:

1. A pipe joint formed between a pin section and a box section, the pipe joint comprising:
   the pin and box sections each having a tubular pipe section, engaging at respective first ends in end-to-end arrangement and having a seal element partially therebetween;
   the box section including a box stress collar extending from the first end, the box stress collar being generally cylindrical, axially aligned with the tubular box pipe section and having an inner diameter of the same size as the outer diameter of the pin section, enabling the box stress collar to be placed about the pin section;
   the pin and the box sections being secured together via one or more dogs housed in the box collar;
   wherein the one or more dogs, responsive to exertion of radial pressure thereon, engage corresponding portions of the pin and thereby cause the pin and box to be sealed together; and
   the pin section including a circumferential collar located to engage a profiled end surface of the box stress collar on make-up of the joint, the circumferential collar including a circumferential pin channel defined by a pin edge rim, the profiled end surface of the box section including a box channel defined by an inner rim and an outer rim, the circumferential pin channel housing the inner rim of the box and the box channel housing the pin edge rim.

2. The pipe joint according to claim 1, wherein each channel rim has an inner-facing channel wall parallel to the pipe joint axis.

3. The pipe-joint according to claim 2, wherein the box channel has a rectangular cross-section.

4. The pipe-joint according to claim 3, wherein both the box and the pin channels have a rectangular cross-section.

5. The pipe-joint according to claim 1, wherein one or both of the box channel or the pin channel have internal corners, said internal corners being curved to reduce corrosion.

6. The pipe-joint according to claim 1, wherein the ratio of the depth of the box channel to the width of the box channel is from 0.15-0.25.

7. The pipe-joint according to claim 6, wherein the ratio is from 0.19-0.23.

8. The pipe joint according to claim 1, wherein the one or more dogs is movable radially, each of the one or more dogs having one or more oblique surfaces within the box section.

9. The pipe joint according to claim 8, wherein the joint includes a push screw, wherein actuation of the push screw engages the dog and causes radial motion of the dog.

10. The pipe joint according to claim 9, wherein the push screw is threadably mounted to the box section.

11. The pipe joint according to claim 10, wherein the push screw includes a slot and key arrangement.

12. The pipe joint according to claim 11, wherein the push screw includes an aperture to ease actuation and facilitate tightening of the push screw.

13. The pipe joint according to claim 12, wherein the push screw has a frustoconical head, the head being housed within a channel in the dog, a key engaging the dog, across the end of the channel to prevent release of the head from the channel.

14. The pipe joint according to claim 1, wherein an end of the box section is chamfered.

\* \* \* \* \*